(12) United States Patent
Evans et al.

(10) Patent No.: US 7,502,669 B1
(45) Date of Patent: Mar. 10, 2009

(54) APPARATUS AND METHOD FOR GRAPHICALLY DISPLAYING DISK DRIVE ENCLOSURES AND CABLING IN A DATA STORAGE SYSTEM

(75) Inventors: T. David Evans, Rutland, MA (US); Morrie Gasser, Hopkinton, MA (US); Nancy Welch, Charlton, MA (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 11/474,556

(22) Filed: Jun. 26, 2006

(51) Int. Cl.
*G05D 1/02* (2006.01)
(52) U.S. Cl. .................................... 700/302
(58) Field of Classification Search .................. 700/8, 700/1, 17, 22, 27, 302
See application file for complete search history.

(56) References Cited

U.S. PATENT DOCUMENTS

| | | | | |
|---|---|---|---|---|
| 5,822,782 | A * | 10/1998 | Humlicek et al. | 711/170 |
| 6,366,965 | B1 * | 4/2002 | Binford et al. | 710/8 |
| 6,446,199 | B1 * | 9/2002 | Howe et al. | 713/1 |
| 6,809,505 | B2 * | 10/2004 | Peeke et al. | 324/66 |
| 6,959,399 | B2 * | 10/2005 | King et al. | 714/6 |
| 7,142,416 | B2 * | 11/2006 | Subbarao et al. | 31/683 |
| 2006/0056101 | A1 * | 3/2006 | Wakamatsu | 360/77.04 |
| 2007/0168053 | A1 * | 7/2007 | Hendrickson et al. | 700/28 |

OTHER PUBLICATIONS

"RAIDWatch Manger" 2004; Infortend; pp. 1-2.*
"Dot Hill SANnet II 200 FC Array Technical Product Descuprtion Guide"; 2003; pp. 1-31.*
"Dell SAS RAID Storage Manager User's Guide"; 2005 pp. 1-60.*
"SCSI Solutions White Paper-HP-UX"; Dec. 2003; pp. 1-21.*
"Infinsan ATAboy ATA disk based Raid"; Aug. 13, 2004; Nexsan Technologies; pp. 1-2.*

* cited by examiner

*Primary Examiner*—Albert DeCady
*Assistant Examiner*—Chad Rapp
(74) *Attorney, Agent, or Firm*—BainwoodHuang

(57) ABSTRACT

A data storage system is configured to provide a graphical display that shows the user a logical schematic of interconnected disk enclosures of a data storage system along with any erroneous connections among the disk enclosures. The graphical display, therefore, allows the user to visually identify the disk drive enclosures in the data storage system and any erroneous connections formed between the disk enclosures. Additionally, the data storage system is configured to monitor the connections among the disk enclosures and provide updated graphical displays to the user showing any changes to the connections among the disk enclosures. In the event that a connection between two disk enclosures malfunctions or becomes inoperable, the graphical display allows the user to easily identify the location of connection error.

20 Claims, 6 Drawing Sheets

APPARATUS AND METHOD FOR GRAPHICALLY DISPLAYING DISK DRIVE ENCLOSURES AND CABLING IN A DATA STORAGE SYSTEM

BACKGROUND

A typical data storage system stores and retrieves data for one or more external host devices. Such a data storage system typically includes processing circuitry and a set of disk drives. In general, the processing circuitry performs load and store operations on the set of disk drives on behalf of the host devices.

In certain data storage systems, the disk drives of the data storage system are distributed among one or more separate disk drive enclosures and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

In the aforementioned data storage system, the processing circuitry and the disk drive enclosures are typically interconnected in a serial manner using a number of cables to provide the front end processing circuitry with access to any of the individual disk drives of the disk drive enclosures. For example, in the case where the data storage system includes multiple disk drive enclosures, a first cable electrically couples the processing circuitry to a first enclosure, a second cable electrically couples the first enclosure to a second enclosure, a third cable electrically couples the second enclosure to a third enclosure, and so on until each of the disk drive enclosures in the data storage system are serially coupled to the processing circuitry.

SUMMARY

As indicated above, certain data storage systems include processing circuitry and multiple disk drive enclosures serially interconnected by cables. When a user or technician interconnects the disk drive enclosures, however, the user must ensure that the disk drive enclosures are properly connected to the processing circuitry and each other to provide the processing circuitry with access to data stored by any or all of the disk drive enclosures. In the case where the disk drive enclosures are improperly connected, when a host device attempts to access data on the misconnected disk drive enclosure, rather than providing the requested data, the data storage system would provide a "data unavailable" condition to the host device.

In order to ensure properly operable interconnections among the disk drive enclosures, the user can visually and physically inspect cable connections among the disk drive enclosures. However, in the case where multiple disk drive enclosures are located in different physical locations, such as in a different rack, such visual and physical inspection can be time consuming. Also during the visual and physical inspection, because of the number of disk drive enclosures in the data storage system and the various locations of the disk drive enclosures, the user may fail to detect the presence of an erroneous or missing connection among the disk drive enclosures. For example, the user might not detect that a cable was seated wrongly when coupled to the disk drive enclosure or that a pin had been bent during the connection process.

By contrast to the conventional approach for detecting errors in the interconnection of disk drive enclosures in a data storage system, embodiments of the invention are directed to a method and apparatus for graphically displaying disk drive enclosures and cabling in the data storage system. The data storage system is configured to provide a graphical display that shows the user a logical schematic of interconnected disk enclosures of a data storage system along with any erroneous connections among the disk enclosures. The graphical display, therefore, allows the user to visually identify the disk drive enclosures in the data storage system and any erroneous connections formed between the disk enclosures. Additionally, the data storage system is configured to monitor the connections among the disk enclosures and provide updated graphical displays to the user showing any changes to the connections among the disk enclosures. In the event that a connection between two disk enclosures malfunctions or becomes inoperable, the graphical display allows the user to easily identify the location of connection error.

In one arrangement a storage system is configured to graphically display electrical connections among disk enclosures of the storage system. The data storage system identifies each disk enclosure of the storage system and detects connection characteristics of electrical connections among the identified disk enclosures of the storage system. The connection characteristics indicate a relative interconnection order of the disk enclosures of the storage system. The storage system then outputs a graphical representation of each identified disk enclosure of the storage system and the detected connection characteristics of the electrical connections among the identified disk enclosures. Based upon the graphical output, a user can easily identify the number of disk enclosures present within the data storage system and the relative order of the connections among the disk enclosures without having to manually check each disk enclosure and electrical interconnection within the data storage system.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to a method and apparatus for graphically displaying disk drive enclosures and cabling in the data storage system. The data storage system is configured to provide a graphical display that shows the user a logical schematic of interconnected disk enclosures of a data storage system along with any erroneous connections among the disk enclosures. The graphical display, therefore, allows the user to visually identify the disk drive enclosures in the data storage system and any erroneous connections formed between the disk enclosures. Additionally, the data storage system is configured to monitor the connections among the disk enclosures and provide updated graphical displays to the user showing any changes to the connections among the disk enclosures. In the event that a connection between two disk enclosures malfunctions or becomes inoperable, the graphical display allows the user to easily identify the location of connection error.

Figure 1:
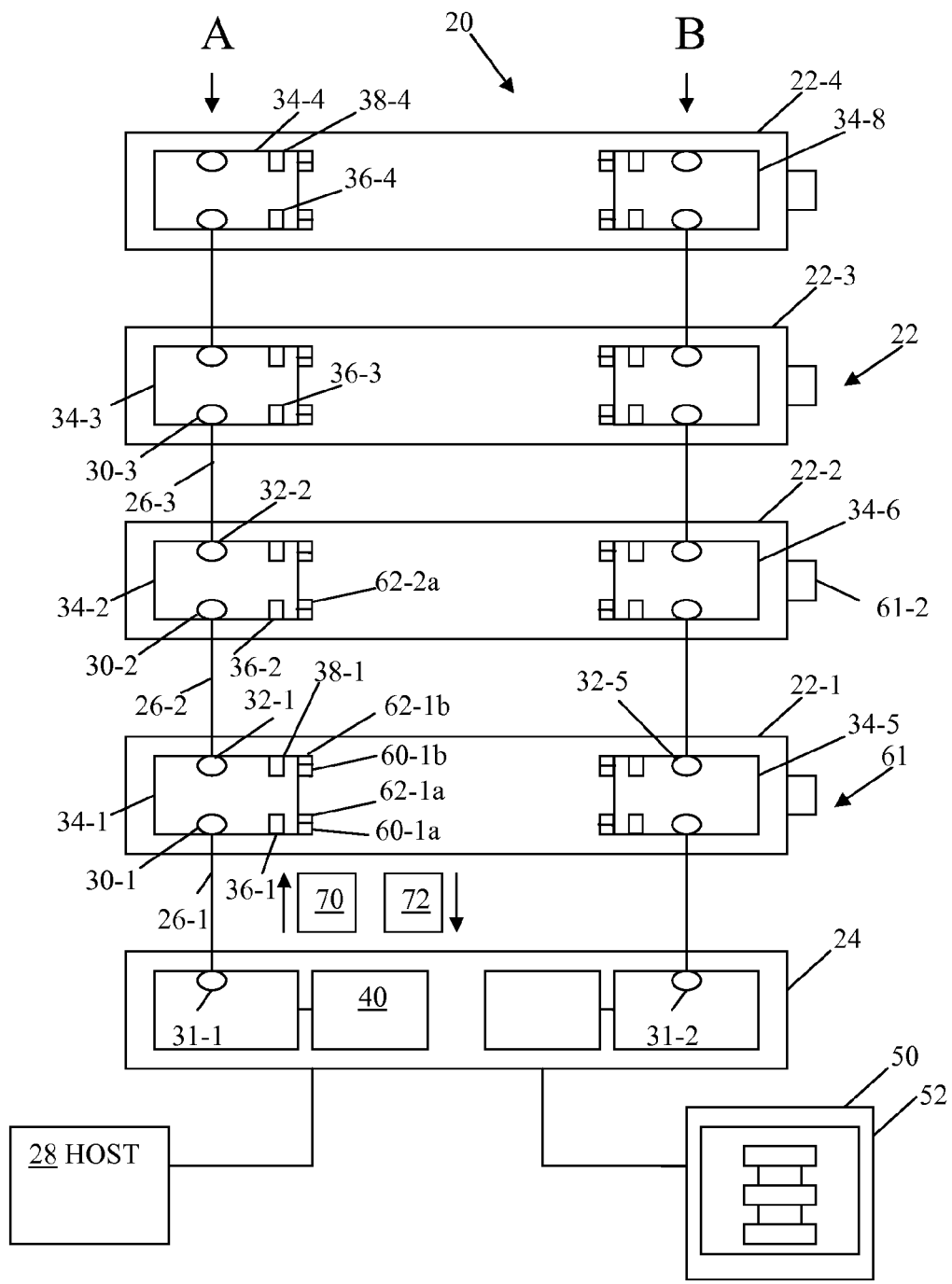
FIG. 1 illustrates a schematic representation of a data storage system, according to one embodiment of the invention.

FIG. 1 illustrates an arrangement of a data storage system 20. The data storage system 20 includes one or more disk enclosures 22 and a disk processor enclosure 24. The data storage system 20 is formed in a modular fashion where the disk enclosures 22 and the disk processor enclosure 24 are installed within a standard rack (not shown) and electrically interconnected by electrical connections, such as cables 26.

Each of the disk enclosures 22 includes an array of magnetic memory units or disk drives. For example, each of the disk enclosures 22 includes several disk drives operable to store data received from a host device 28 or to provide data requested from the host device 28. Each of the disk enclosures 22 includes ports 30, 32 that provide interconnection of the disk enclosures 22 and the disk processor enclosure 24. For example, the first disk enclosure 22-1 includes an input port 30-1 that is electrically coupled to a port 31 of the disk processor enclosure 24 by a first cable 26-1 and an output port 32-1 that is electrically coupled in series to an input port 30-2 of the second enclosure 22-2 by a second cable 26-2. In turn, an output port 32-2 of the second enclosure 22-2 is electrically coupled in series by a third cable 26-3 to an input port 30-3 of the third disk enclosure 22-3. It should be noted that the terms "input port" and "output port" are used to merely distinguish the ports 30, 32 on each disk enclosure 22. One of ordinary skill in the art should understand that the input and output ports 30, 32 on each enclosure 22 allow bidirectional communication within the data storage system 20, both to and from the host device 28.

Each disk enclosure 22 includes a controller 34, such as a link control card (LCC), electrically coupled to the input and output ports 30, 32 of the disk enclosure 22 and configured to provide for data communication among the disk enclosures 22. To provide for such data communications, in one arrangement, each controller 34 of a corresponding disk enclosure 22 is configured to identify neighboring disk enclosures 22 within the data storage system 20 utilizing primary and secondary enclosure identification information 36, 38. For example, taking the first disk enclosure 22-1 as an example, the controller 34-1 stores a primary enclosure identification 36-1, such as a serial number assigned to the first disk enclosure 22-1. The controller 34-1 also stores a secondary enclosure identification 38-1, such as a serial number, of the serially-connected downstream second disk enclosure 22-2. In one arrangement, the controller 34-1 of the first disk enclosure 22-1 receives the secondary disk enclosure identifier 38-1 from the second disk enclosure 22-2 when the second disk enclosure 22-2 is coupled to the first disk enclosure 22-1 by cable 26-2.

The subsequent controllers 34-2 and 34-3 also store enclosure identification information 36, 38. For example, the controller 34-2 stores a primary enclosure identification 36-2 of the second disk enclosure 22-2 and a secondary enclosure identification 38-2 of the subsequently connected third disk enclosure 22-3. Additionally, the controller 34-3 stores a primary enclosure identification 36-3 of the third disk enclosure 22-3 and a secondary enclosure identification 38-4 of the subsequently connected fourth disk enclosure 22-4. As illustrated in FIG. 1, the fourth disk enclosure 22-4 is not connected to a subsequent disk enclosure 22 and, as such, forms the end of the interconnected chain of disk enclosures 22. In this case, while the controller 34-4 of the fourth disk enclosure 22-4 stores its own primary enclosure identification 36-4, because the fourth disk enclosure 22-4 is not connected to a subsequent disk enclosure 22, the controller 34-1 stores, as the secondary enclosure identification 38-4 a value, such as a null value, that indicates that the fourth disk enclosure 22-4 does not connect to a subsequent disk enclosure 22.

In one arrangement, each of the controllers 34 of the disk enclosures 22 includes a connection indicator diode 60 and a fault indicator diode 62 electrically coupled with each of the input and output ports 30, 32 to indicate a status of the electrical connections 26 formed among the disk enclosures 22. For example, for the first disk enclosure 22-1, the input port 30-1 includes a connection indicator diode 60-1$a$ and a fault indicator diode 62-1$a$ and the output port 32-1 includes a connection indicator diode 60-1$b$ and a fault indicator diode 62-1$b$.

The connection indicator diodes 60, such as LEDs, are operable to provide the status of its corresponding port 30, 32. Taking controller 34-1 as an example, the controller 34-1 activates the connection indicator diode 60-1$b$ based upon a detected status of the output port 32-1.

For example, when the controller 34-1 detects an inactive connection, such as an absence of an electrical connection associated with the output port 32-1 (e.g., a missing electrical connection 26-2), the controller 34-1 refrains from activating the connection indicator diode 60-1$b$. In the case where the controller 34-1 detects the presence of an operative or active electrical connection associated with the output port 32-1, independent the validity of the connection, the controller 34-1 activates the connection indicator diode 60-1$b$ to indicate the full connectivity of the output port 32-1. For example, the controller 34-1 activates the connection indicator diode 60-1$b$ and causes the diode 60-1$b$ to emanate a solid color. In the case where the controller 34-1 detects that the input port 30-1 does not receive signals from the disk processor enclosure 24, such as caused by a faulty connection 26-1, the controller 34-1 activates the connection indicator diode 60-1$a$ to indicate an inoperative connection associated with the input port 30-1. For example, the controller 34-1 activates the connection indicator diode 60-1$a$ and causes the connection indicator diode 60-1 to blink at a given rate.

The fault indicator diode 62, such as an LED, is operable to provide an indication of the presence or absence of a connection fault associated with an input or output port 30, 32. Taking controller 34-1 as an example, the controller 34-1 activates the fault indicator diode 62-1$b$ based upon the detected status of connection 26 associated with the output port 32-1.

In the case where the controller 34-1 detects a valid or operable connection associated with a port 30-1, 32-2, the controller 34-1 refrains from activating the associated fault indicator diode 62-, 60-2. For example, in the case where the controller 34-1 detects a valid or operable connection associated with the output port 32-1 (e.g., a connection that allows the disk processor enclosure to access the magnetic disk drives of both the first and second disk enclosures 22-1, 22-2), the controller 34-1 does not activate the fault indicator diode 62-1b. In the case where the controller 34-1 detects an inoperable or live but incorrect connection associated with associated with a port 30-1, 32-1 the controller 34-1 activates the associated fault indicator diode 62-1, 62-2 to indicate the presence of the live but incorrect (e.g., inoperative) connection. In one arrangement, the controller 34-1 can detect a live but incorrect connection associated with the input port 30-1 if the input port 30-1 within loop A were connected to an output port 32-5 of the controller 34-5 in loop B. In such a case, when the controller 34-1 detects the inoperable connection associated with the input port 32-1, the controller 34-1 activates the fault indicator diode 62-1a to indicate the presence of the inoperative connection. For example, the controller 34-1 activates the fault indicator diode 62-1a and causes the fault indicator diode 62-1a, in one arrangement, to emanate a solid color.

In the case where the controller 34-1 detects a degraded (e.g., active but compromised or slowed) connection associated with an input or output port 30-1, 32-1, the controller 34-1 activates the associated fault indicator diode 62-1, 62-2 to indicate the presence of a partial fault that can degrade the performance of the disk enclosures 22-1, 22-2 in the data storage system 20. For example, the controller 34-1 detects a degraded or compromised connection on the output port 32-1 when a hardware fault associated with the disk enclosure 22-1 is present, a bent pin associated with the cable 26-2 is present, or a dirty contact associated with the output port 32-1 is present. In one arrangement, when the controller 34-1 detects a degraded connection associated with the output port 32-1, the controller 34-1 causes the fault indicator diode 62-1b to blink at a given rate.

In one arrangement, the disk enclosures 22 and disk processor enclosure 24 form two communications loops, labeled loop A and loop B. Loop A begins at a disk processor port 30-1 and ends at the controller 34-4 of a fourth disk enclosure 22-4. Loop B begins at a disk processor port 30-2 and ends at a controller 34-8 of the fourth disk enclosure 22-4. Each loop A, B provides connection redundancy within the data storage system 20. For example, in the configuration shown in FIG. 1, upon failure of the controller 34-2 of loop A in the second disk enclosure 22-2, the controller 34-6 in loop B operates as a backup controller for the second disk enclosure 22-2, thereby providing the disk processor enclosure 24 with the ability to maintain a data connection with the second disk enclosure 22-2 as well as with the subsequently connected third and fourth first disk enclosures 22-3, 22-4.

Figure 2:
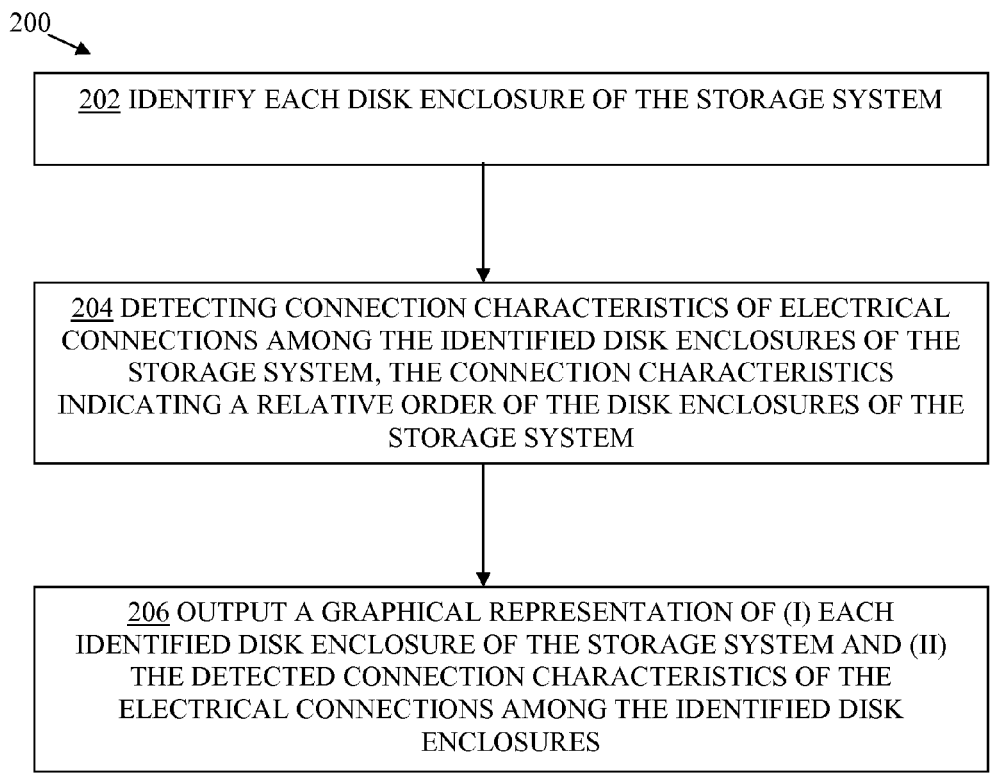
FIG. 2 is a flowchart that illustrates a procedure performed by the data storage system of FIG. 1, according to one embodiment of the invention.

The disk processor enclosure 24 includes one or more controllers or storage processors 40 configured to control certain functions of the data storage system 20. For example, the storage processor 40 is configured to perform load and store operations on the magnetic storage devices of the disk enclosures 22 on behalf of the host device 28. Additionally, the storage processor 40 is configured to detect the presence and order of connection of the disk enclosures 22 associated with the data storage system 20 and provide a graphical display representing of the disk enclosures 22 and electrical connections 26 present among the disk enclosures 22 of the storage system 20. FIG. 2 is a flowchart 200 that illustrates such a procedure performed by the data storage system 20.

In step 202, the storage processor 40 identifies each disk enclosure 22 of the storage system 20. In one arrangement, the storage processor 40 identifies each disk enclosure 22 when the disk enclosure 22 is connected as part of the data storage system 20. For example, when a user electrically couples a disk enclosure 22 to the disk processor enclosure 24 for the first time, the disk processor enclosure 24 assigns an address number to the disk enclosure 22. The value of the address number is based upon the order in which the disk processor enclosure 24 identifies the disk enclosures 22. For example, with reference to FIG. 1, during the identification process, the storage processor 40 assigns the first disk enclosure 22-1 an address number "1", the second disk enclosure 22-2 an address number "2", the third disk enclosure 22-3 an address number "3", and the fourth disk enclosure 22-4 an address number "4". Once assigned, the address number is persistent in the disk enclosure 22 and is not subject to change, regardless of changes in the cabling order among the disk enclosures 22 in the data storage system 20. As a result of the identification, the storage processor 40 creates a graphical object of the disk enclosures 22 for subsequent display.

Returning to FIG. 2, in step 204, the storage processor 40 detects connection characteristics of electrical connections among the identified disk enclosures 22 of the storage system 20 where the connection characteristics indicate a relative order of the disk enclosures 22 of the storage system 20. While the storage processor 40 can be configured to detect the relative order of the disk enclosures 22 in a variety of ways, in one arrangement, the storage processor 40 utilizes the primary and secondary enclosure identification information 36, 38 stored by each controller 34 to detect the presence of cables 26 connecting the disk enclosures 22 and to determine the connection order of the disk enclosures 22 within the data storage assembly 20.

For example, during operation, the storage processor 40 retrieves the primary and secondary enclosure identification information 36, 38 from each disk enclosure 22. In order to detect if a connection exits between two disk enclosures 22, the storage processor 40 compares the secondary enclosure identification 38 of one disk enclosure 22 with the primary enclosure identification 36 of a second disk enclosure 22. For example, with reference to FIG. 1, the storage processor 40 compares the secondary enclosure identification 38-1 of the first enclosure 22-1 with the primary enclosure identification 36-2, 36-3, 36-4 of the second, third, and fourth disk enclosures 22-2, 22-3, 22-4. Because the secondary enclosure identification 38-1 does not match the primary enclosure identification 36-3, 36-4 of the third and fourth disk enclosures 22-3, 22-4, the storage processor 40 detects an absence of an electrical connection between the first disk enclosure 22-1 and the third and fourth disk enclosures 22-3, 22-4.

However, because the secondary enclosure identification 38-1 does match the primary enclosure identification 36-2 of the second disk enclosure 22-2, the storage processor 40 detects the presence of an electrical connection between the first disk enclosure 22-1 and the second disk enclosure 22-2.

Based upon the comparison process, the storage processor 40 detects the second disk enclosure 22-2 is not only electrically connected to the first disk enclosure 22-1 but that the second disk enclosure 22-2 is connected downstream from the first disk enclosure 22-1. As a result, the storage processor 40 creates a graphical object of the connection 26 between the first and second disk enclosures 22-1, 22-2 for subsequent display. The storage processor 40 continues the comparison process for each of the disk enclosures 22 of the storage system 20 until the connection order of the disk enclosures 22 of the data storage system is complete.

Figure 3:
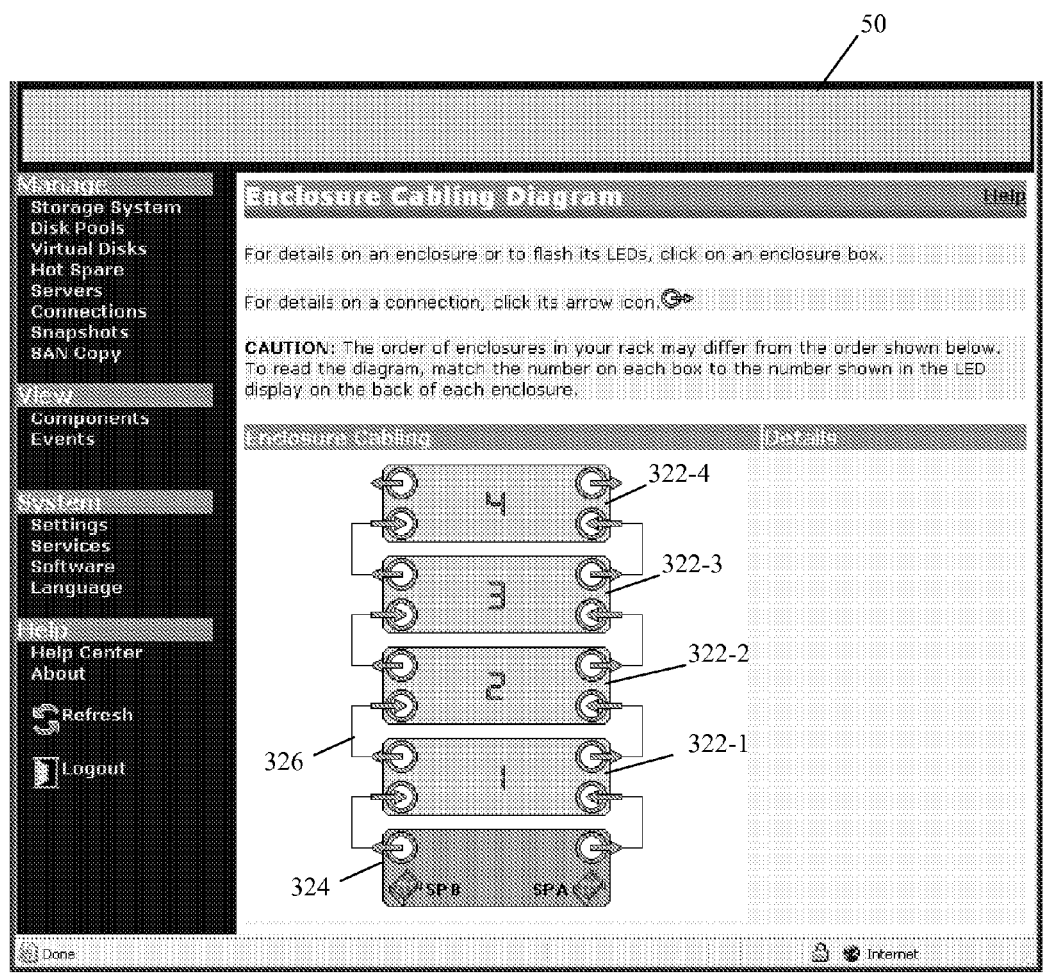
FIG. 3 illustrates a cabling diagram interface as provided by the data storage system of FIG. 1, according to one embodiment of the invention.

Returning to FIG. 2, in step 206, the storage processor 40 outputs a graphical representation 50 of each identified disk enclosures 22 of the storage system 20 and the detected connection characteristics of the electrical connections among the identified disk enclosures 22. For example, as shown in FIG. 3, the graphical representation 50 provides the user with graphical objects that represent the disk processor enclosure 324, the disk enclosures 322-1 through 322-4, and the electrical connections 326 formed between the disk processor enclosure 324 and the disk enclosures 322-1 through 322-4. The graphical representation 50 of the disk enclosures 28 is static and the order of enclosures may not necessarily reflect the physical order of the disk enclosures 22, such as arranged in a rack. Instead, the order of the disk enclosures 322-1 through 322-4 are shown in the graphical representation 50 in the order in which the storage processor 40 discovered the disk enclosures (e.g., based upon the detected connection characteristics).

The graphical representation 50 can be provided to the user in a variety of ways. For example, as shown in FIG. 1, the graphical representation 50 can be displayed on a monitor 52. In one arrangement, storage processor 40 is configured with an internal web server which transmits, to the user, a HyperText Markup Language (HTML) for the graphical representation. For example, the user opens a web browser on his computer and enters the IP address of the storage processor 40 to establish a session with the web server on the storage processor 40. The user requests the graphical representation 50, using HTTP over this connection, and receives the HTML for the graphical representation 50 from the storage processor's 40 web server for display on the user's monitor 52.

Based upon the graphical display 50, the user can determine the number of disk enclosures 22 includes within the data storage system 20 and can also view representations of the electrical connections between the disk enclosures 22 for the purposes of troubleshooting possible connection errors within the data storage system 20.

Figure 4:
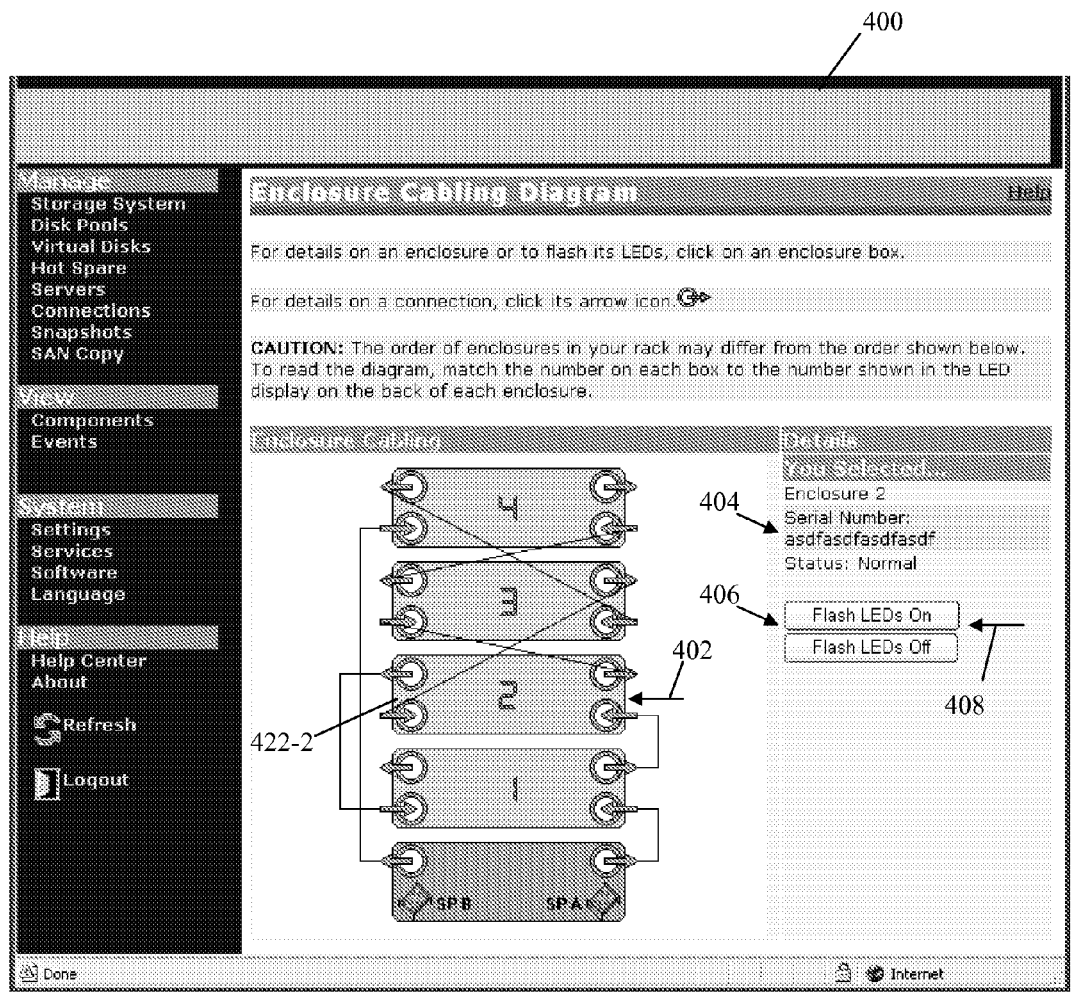
FIG. 4 illustrates a cabling diagram interface as provided by the data storage system of FIG. 1, the cabling diagram interface displaying disk enclosure information according to one embodiment of the invention.

In one arrangement, the graphical representation 50 of the data storage system 20 is configured as a graphical user interface or cabling diagram interface that provides the user with information about the disk enclosures 24 or the electrical connections 26 within the data storage system 20 based upon a user input. For example, FIG. 4 illustrates an example of a cabling diagram interface 400 displayed to a user. In one arrangement, the cabling diagram interface 400 provides the user with information regarding a disk enclosure 22 in the system when the user provides an enclosure identification request to the storage processor 40 through the cabling diagram interface 400. For example, assume the user wants to determine the serial number of the second disk enclosure 22-2 of the data storage system 20. The user provides an enclosure identification request 402 to the storage processor 40, such as by selecting the graphical representation of the second disk enclosure 422-2 on the cabling diagram interface 400 utilizing an input tool, such as a mouse. In response to the request, the storage processor 40 provides or displays identification information 404 associated with the corresponding disk enclosure 22-2 of the storage system 20. For example, the cabling diagram interface 400 displays serial number information 404 associated with the second disk enclosure 22-2, thereby allowing the user to identify the disk enclosure 22-2.

As indicated above, the graphical representation 50 provided to the user is not intended to mirror the order of the disk enclosures 22 within a particular rack. The user can have the disk enclosures 22 arranged in the rack in an order that is different from the order shown in the graphical representation. As such, to help users map each graphical representation 50 of the disk enclosures 422 cabling diagram interface 400 to a physical disk enclosure 22, the storage processor is configured to receive enclosure identification requests through the cabling diagram interface 400 and, in response, activate an enclosure indicator of the corresponding disk enclosure 22.

For example, as shown in FIG. 4, the cabling diagram interface 400 displays a "Flash LEDs On" button 406 associated with the graphical representation of the second disk enclosure 422-2, as selected above. When a user activates the function 408, such as by clicking on the button using an input tool, the storage processor 40, in response, flashes a visual indicator 61 (e.g. a light emitting diode (LED)), such as the visual indicator 61-2 associated with the disk enclosure 22-2, as shown in FIG. 1. The user can then visually identify the disk enclosure 22-2 in the data storage system 20 that corresponds to the graphical representation of the disk enclosure 422-2 on the cabling diagram interface 400 and identify the location of the disk enclosure 22-2 within the storage system 20.

As indicated above, the storage processor 40 is configured to detect the presence of disk enclosures 22 as well as the relative connection order of the disk enclosures 22 in the data storage system 20 and provide a graphical display showing representations of the disk enclosures 22 and connections 26. In one arrangement, the storage processor 40 is also configured to detect and display the status of the electrical connections 26 between the disk enclosures 22 and data storage processor 24 in the data storage system 20. For example, when connecting the disk enclosures 22 to each other, the user does so with the anticipation that the connections are correct and that communications originating at the disk processor enclosure 24 can reach any one of the disk enclosures 22. However, in certain cabling arrangement, the user can create isolated loops, such as by connect the disk processor enclosure 24 to itself, or can connect the disk enclosures 22 together using one or more broken cables 26. As such, by detecting and displaying the status of the electrical connections 26, the storage processor 40 allows the user to identify operational connections 26 and troubleshoot and rectify any identified improper or inoperative electrical connections.

Returning to FIG. 1, in one arrangement, the storage processor 40 operates in conjunction with the controllers 34 of the disk enclosures 22 to detect improper or inoperative connections 26 among the disk enclosures 22. For example, to detect the status of the electrical connections 26 among the disk enclosures 22, the storage processor 24 transmits a polling message 70 to each controller 34 of each disk enclosure 22. Upon reception of the polling message 70, the controller 34 sets an identification bit in the polling message 70 to identify the corresponding disk enclosure 22 to the storage processor 40. Also based upon a status of the connection indicator diode 60 and the fault indicator diode 62 associated with each of the input port 30 and the output port 32, the controller 34 sets a status bit within the polling message 70 to provide the storage processor 40 with the status of an electrical connection associated with the controller 34. For example, assume the controller 34-1 has activated the fault indicator diode 62-1b associated with the output port 32-1 and the controller 34-2 has activated the fault indicator diode 62-2a associated with the input port 30-2 to indicate the presence of a hardware fault associated with the disk enclosure 22-1. As a result, after receiving the polling message 70, the controller 34-1 sets the identification bit in the polling message 70 to identify itself and sets the status bit in the polling message 70 to indicate a fault associated with the output port 32-1. Additionally, after receiving the polling message 70, the controller 34-2 sets the identification bit in the polling message 70 to identify itself and sets the status bit in the polling message 70 to indicate a fault associated with the output port 32-1. The storage processor 40 then receives the polling message 70 as a polling response 72, the polling response indicating, in this case, a hardware fault associated with the disk enclosure 22-1.

When the storage processor 40 receives the polling responses 72 from the disk enclosures 22, the storage processor 40 reviews the identity and status bits of the polling response 72 to identify the disk enclosures 22 to and detect the status of the connections 26 among the disk enclosures 22, whether operative, inoperative (e.g., a live but incorrect connection), or degraded. Based upon the review, the storage processor 40 provides a graphical representation of the status of the electrical connections for each of the disk enclosures 22.

Figure 5:
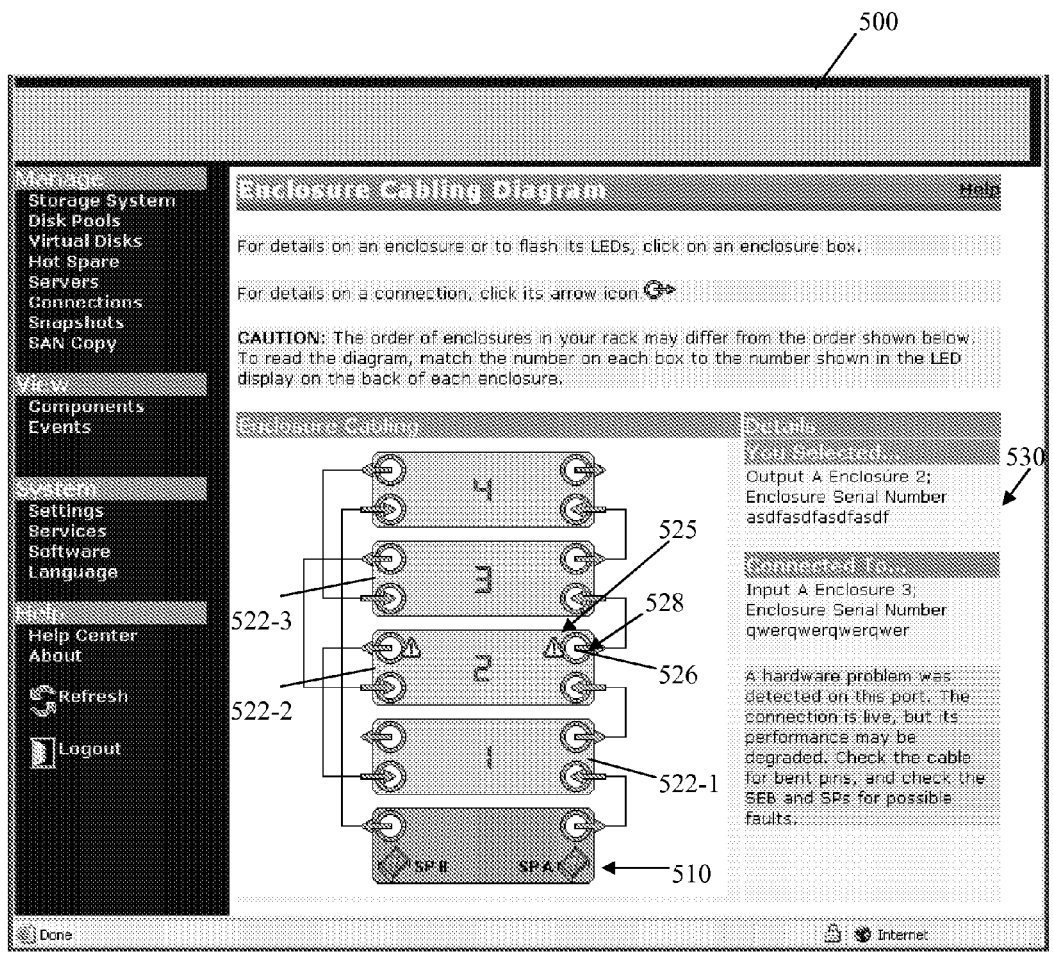
FIG. 5 a cabling diagram interface as provided by the data storage system of FIG. 1, the cabling diagram interface displaying operative connections and degraded connections among the disk enclosures of the data storage system according to one embodiment of the invention.

For example, FIG. 5 illustrates a graphical representation 500 of the disk enclosures 22 and associated electrical connections 26 of the data storage system 20 along with the status of the electrical connections. The graphical representation 500 shows the presence of a degraded connection 512, such as caused by a hardware fault, between a disk enclosure 22 represented by the graphical representation 522-2 and a disk enclosure 22 represented by the graphical representation 522-1. For example, the data storage system 20 indicates the presence of the degraded connection between a first and second disk enclosure 22-1, 22-2 by a fault icon 525 displayed in conjunction with an output port icon 526 of the second graphical disk enclosure representation 522-2. In one arrangement, a user can receive additional information regarding the degraded connection by providing the storage processor 40 with a connection identification request associated with the graphical representation of the electrical connection. For example, the user can select 528 an output port icon 526 utilizing an input device, such as a mouse. In response to the selection 526, the storage processor 40 provides, as part of the graphical representation 500, status information 530 associated with the electrical connection 512. For example, the storage processor 40 provides information regarding the selected disk enclosure representation 522-2 (e.g., number, serial number, or state, as available), information related to the output port 31 associated with the selected disk enclosure representation 522-2 (e.g., disk enclosure loop A output, disk enclosure loop A input, disk enclosure loop B output, or disk enclosure loop B input), information regarding the disk enclosure representation 522-3 connected to the selected disk enclosure representation 522-2 (e.g., number, serial number, or state, as available), information related to an input port 30 associated with the corresponding disk enclosure representation 522-2, and warning or fault information detected, such as corresponding to the fault icon 525. The status information 530 allows the user to identify and correct degraded electrical connections within the data storage system 20.

Figure 6:
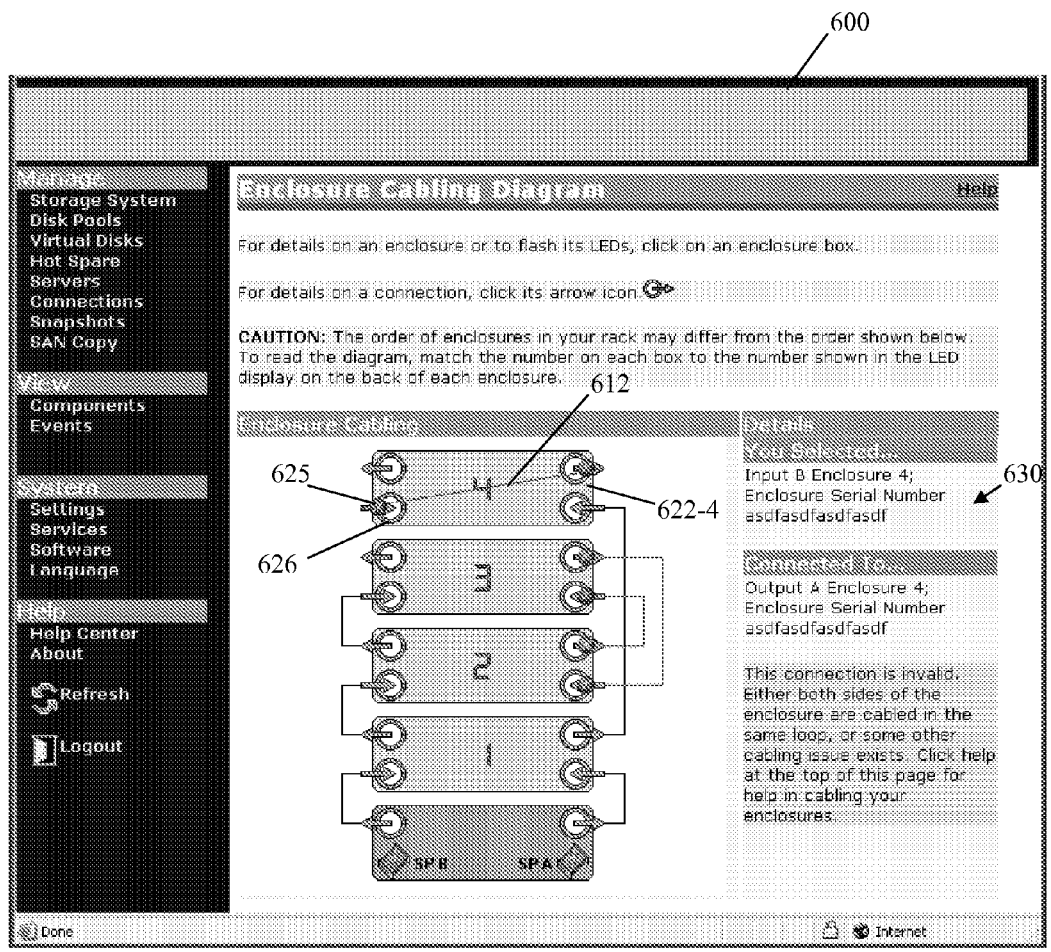
FIG. 6 a cabling diagram interface as provided by the data storage system of FIG. 1, the cabling diagram interface displaying operative connections and inoperative connections among the disk enclosures of the data storage system.

In another example, FIG. 6 illustrates a graphical representation 600 of the disk enclosures 22 and associated electrical connections 26 of the data storage system 20 along with the status of the electrical connections 26. The graphical representation 600 shows the presence of an inoperative connection 612 associated with a disk enclosure 22 represented by the graphical representation 622-4. For example, the data storage system 20 indicates the presence of the inoperative connection between an input port 30 in loop B of a disk enclosure 22-4 and an output port 32 in loop A of the disk enclosure 22-4 as indicated by connection error icons 625 shown in relation to the graphical representation of the disk enclosure 622-4. In one arrangement, a user can receive additional information regarding the improper connection by providing the data storage system 20 with a connection identification request associated with the graphical representation of the electrical connection. For example, the user can select a displayed input port icon 526 utilizing an input device, such as a mouse. In response to the selection 528, the storage processor 40 provides, as part of the graphical representation 600, status information 630 associated with the electrical connection 612. For example, the status information 630 indicates that the both loop A and loop B of the enclosure 22-4 are included in the same loop. The status information 630 allows the user to correct the inoperative cable connection 26 in the data storage system 20.

While this invention has been particularly shown and described with references to preferred embodiments thereof, it will be understood by those skilled in the art that various changes in form and details may be made therein without departing from the spirit and scope of the invention as defined by the appended claims.

For example, FIG. 1 illustrates the disk enclosures 22 as being connected in an ascending order with the first disk enclosure 22-1 electrically coupled to the second disk enclosure 22-2, the second disk enclosure 22-2 electrically coupled to the third disk enclosure 22-3, and the third disk enclosure 22-3 electrically coupled to the fourth disk enclosure 22-4. Such illustration is by way of example only. In one arrangement, the disk enclosures can be electrically connected in any order. For example, the first disk enclosure 22-1 can be electrically coupled to the third disk enclosure 22-3, the third disk enclosure 22-3 can be electrically coupled to the second disk enclosure 22-2, and the second disk enclosure can be electrically coupled to the fourth disk enclosure 22-4.

As indicated above, to detect the status of the electrical connections 26 among the disk enclosures 22 (e.g., operative, inoperative, or degraded), the storage processor 40 transmits a polling message 70 to each controller 34 of each disk enclosure 22. In one arrangement, after the storage processor 40 receives a polling response 72 indicating the status of the electrical connections 26, the storage processor 40 transmits additional, subsequent polling messages 70 to the disk enclosures 22 at periodic polling intervals. For example, the storage processor 40 can transmit polling messages 70 to the disk enclosures 22 at a rate of one polling message 70 every five seconds. In response to the periodic polling messages 70, the storage processor 40 receives corresponding polling responses 72 from the disk enclosures 22. In the event that an operative connection 26 between two disk enclosures 22 becomes inoperative over time (e.g., the cable 26 becomes disconnected from one of the disk enclosures) the controller 34 associated with one of the disk enclosures 22 sets a status bit within the polling message 70 to indicate a change in the status of the electrical connection 26 and transmits the polling message 70 to the storage processor 40 as a polling response 72. Based upon the polling response 72, the storage processor 40 produces an updated graphical representation of the disk enclosures 22 and electrical connections 26 to indicate the presence of an inoperative or degraded connection within the data storage system 20. The data storage system 20, therefore, provides a user with information regarding the system to account for changes that occur within the system 20 over time.

What is claimed is:

1. In a storage system, a method for graphically displaying electrical connections among disk enclosures of the storage system, comprising:
   identifying each disk enclosure of the storage system;
   detecting connection characteristics of electrical connections among the identified disk enclosures of the storage system, the connection characteristics indicating a relative order of the disk enclosures of the storage system; and outputting a graphical representation of (i) each identified disk enclosure of the storage system and (ii) the detected connection characteristics of the electrical connections among the identified disk enclosures.

2. The method of claim 1, wherein:

each disk enclosure of the storage system comprises a primary enclosure identification associated with the disk enclosure itself and a secondary enclosure identification associated with a serially-connected, downstream disk enclosure of the storage system;

detecting connection characteristics of electrical connections further comprises:

comparing the secondary enclosure identification of a first enclosure of the storage system with the primary enclosure identification of a second enclosure of the storage system, when the secondary enclosure identification matches the primary enclosure identification, detecting a presence of an electrical connection between the first enclosure and the second enclosure, and when the secondary enclosure identification does not match the primary enclosure identification, detecting an absence of an electrical connection between the first enclosure and the second enclosure; and outputting the graphical representation comprises outputting a graphical representation of (i) the first disk enclosure of the storage system and the second disk enclosure of the storage system and (ii) the electrical connection formed between the first disk enclosure of the storage system and the second disk enclosure of the storage system.

3. The method of claim 1, further comprising:

receiving an enclosure identification request associated with an outputted graphical representation of a disk enclosure of the storage system; and in response to the enclosure identification request, activating an enclosure indicator of the disk enclosure of the storage system corresponding to the outputted graphical representation of the disk enclosure of the storage system, the enclosure indicator identifying a location of the disk enclosure of the storage system.

4. The method of claim 1, further comprising:

receiving an enclosure identification request associated with an outputted graphical representation of a disk enclosure of the storage system; and in response to the enclosure identification request, outputting identification information associated with the corresponding disk enclosure of the storage system.

5. The method of claim 1, further comprising:

detecting a status of an electrical connection between a first disk enclosure of the storage system and a second disk enclosure of the storage system, the status of the electrical connection indicating one of an operative connection between the first disk enclosure of the storage system and the second disk enclosure of the storage system, a degraded connection between the first disk enclosure of the storage system and the second disk enclosure of the storage system, and an inoperative connection between the first disk enclosure of the storage system and the second disk enclosure of the storage system; and outputting a graphical representation of the status of the connection between the first disk enclosure of the storage system and the second disk enclosure of the storage system.

6. The method of claim 5, wherein detecting the status of an electrical connection comprises:

transmitting a polling message to the first disk enclosure of the storage system; and receiving a polling response in response to the polling message, the polling response indicating one of (i) a degraded connection between the first disk enclosure of the storage system and the second disk enclosure of the storage system in response to the first enclosure of the storage system activating a status indicator associated with the first enclosure of the storage system (ii) an inoperative connection between the first disk enclosure of the storage system and the second disk enclosure of the storage system in response to the first disk enclosure of the storage system activating the status indicator associated with the first disk enclosure of the storage system and (iii) an operative connection between the first disk enclosure of the storage system and the second disk enclosure of the storage system in response to the first disk enclosure of the storage system not activating the status indicator associated with the first disk enclosure of the storage system.

7. The method of claim 6, wherein receiving the polling response in response to the polling message comprises receiving the polling response in response to the polling message, the polling response indicating one of (i) a degraded connection between the first disk enclosure of the storage system and the second disk enclosure of the storage system in response to the first disk enclosure of the storage system activating a fault indication diode associated with the first disk enclosure of the storage system (ii) an inoperative connection between the first disk enclosure of the storage system and the second disk enclosure of the storage system in response to the first disk enclosure of the storage system activating a connection indicator diode associated with the first disk enclosure of the storage system and (ii) an operative connection between the first disk enclosure of the storage system and the second disk enclosure of the storage system in response to the first disk enclosure of the storage system not activating either the fault indication diode or the connection indicator diode associated with the first disk enclosure of the storage system.

8. The method of claim 6, further comprising:

transmitting subsequent polling messages to the first disk enclosure of the storage system at periodic polling intervals; and receiving subsequent polling responses at periodic polling intervals in response to the subsequent polling messages, the subsequent polling responses indicating an updated status of the electrical connection between the first disk enclosure of the storage system and the second disk enclosure of the storage system.

9. The method of claim 5, further comprising:

receiving a connection identification request associated with an outputted graphical representation of an electrical connection formed between a first disk enclosure of the storage system and a second disk enclosure of the storage system; and in response to the enclosure connection identification request, outputting status information associated with the electrical connection formed between the first disk enclosure of the storage system and the second disk enclosure of the storage system.

10. A disk processor enclosure of a storage system, comprising:

at least one communications interface; and a controller electrically coupled to the at least one communications interface wherein the controller is configured to:

identify each disk enclosure of the storage system, detect connection characteristics of electrical connections among the identified disk enclosures of the storage system, the connection characteristics indicating a relative order of the disk enclosures of the storage system, and output a graphical representation of (i) each identified disk enclosure of the storage system and (ii) the detected connection characteristics of the electrical connections among the identified disk enclosures.

11. The disk processor enclosure of claim 10, wherein:

each disk enclosure of the storage system comprises a primary enclosure identification associated with the disk enclosure itself and a secondary enclosure identification associated with a serially-connected, downstream disk enclosure of the storage system;

when detecting connection characteristics of electrical connections, the controller is further configured to:

compare the secondary enclosure identification of a first enclosure of the storage system with the primary enclosure identification of a second enclosure of the storage system, when the secondary enclosure identification matches the primary enclosure identification, detect a presence of an electrical connection between the first enclosure and the second enclosure, and when the secondary enclosure identification does not match the primary enclosure identification, detect an absence of an electrical connection between the first enclosure and the second enclosure; and when outputting the graphical representation the controller is configured to output a graphical representation of (i) the first disk enclosure of the storage system and the second disk enclosure of the storage system and (ii) the electrical connection formed between the first disk enclosure of the storage system and the second disk enclosure of the storage system.

12. The disk processor enclosure of claim 10, wherein the controller is configured to:

receive an enclosure identification request associated with an outputted graphical representation of a disk enclosure of the storage system; and in response to the enclosure identification request, activate an enclosure indicator of the disk enclosure of the storage system corresponding to the outputted graphical representation of the disk enclosure of the storage system, the enclosure indicator identifying a location of the disk enclosure of the storage system.

13. The disk processor enclosure of claim 10, wherein the controller is further configured to:

receive an enclosure identification request associated with an outputted graphical representation of a disk enclosure of the storage system; and in response to the enclosure identification request, output identification information associated with the corresponding disk enclosure of the storage system.

14. The disk processor enclosure of claim 10, wherein controller is further configured to:

detect a status of an electrical connection between a first disk enclosure of the storage system and a second disk enclosure of the storage system, the status of the electrical connection indicating one of an operative connection between the first disk enclosure of the storage system and the second disk enclosure of the storage system, a degraded connection between the first disk enclosure of the storage system and the second disk enclosure of the storage system, and an inoperative connection between the first disk enclosure of the storage system and the second disk enclosure of the storage system; and output a graphical representation of the status of the connection between the first disk enclosure of the storage system and the second disk enclosure of the storage system.

15. The disk processor enclosure of claim 14, wherein, when detecting the status of an electrical connection, the controller is configured to:

transmit a polling message to the first disk enclosure of the storage system; and receive a polling response in response to the polling message, the polling response indicating one of (i) a degraded connection between the first disk enclosure of the storage system and the second disk enclosure of the storage system in response to the first enclosure of the storage system activating a status indicator associated with the first enclosure of the storage system (ii) an inoperative connection between the first disk enclosure of the storage system and the second disk enclosure of the storage system in response to the first disk enclosure of the storage system activating the status indicator associated with the first disk enclosure of the storage system and (iii) an operative connection between the first disk enclosure of the storage system and the second disk enclosure of the storage system in response to the first disk enclosure of the storage system not activating the status indicator associated with the first disk enclosure of the storage system.

16. The disk processor enclosure of claim 15, wherein when receiving the polling response in response to the polling message, the controller is configured to receive the polling response in response to the polling message, the polling response indicating one of (i) a degraded connection between the first disk enclosure of the storage system and the second disk enclosure of the storage system in response to the first disk enclosure of the storage system activating a fault indication diode associated with the first disk enclosure of the storage system (ii) an inoperative connection between the first disk enclosure of the storage system and the second disk enclosure of the storage system in response to the first disk enclosure of the storage system activating a connection indicator diode associated with the first disk enclosure of the storage system and (ii) an operative connection between the first disk enclosure of the storage system and the second disk enclosure of the storage system in response to the first disk enclosure of the storage system not activating either the fault indication diode or the connection indicator diode associated with the first disk enclosure of the storage system.

17. The disk processor enclosure of claim 15, wherein the controller is further configured to:

transmit subsequent polling messages to the first disk enclosure of the storage system at periodic polling intervals; and receive subsequent polling responses at periodic polling intervals in response to the subsequent polling messages, the subsequent polling responses indicating an updated status of the electrical connection between the first disk enclosure of the storage system and the second disk enclosure of the storage system.

18. The disk processor enclosure of claim 14, wherein the controller is further configured to:

receive a connection identification request associated with a outputted graphical representation of an electrical connection formed between a first disk enclosure of the storage system and a second disk enclosure of the storage system; and in response to the enclosure connection identification request, output status information associated with the electrical connection formed between the first disk enclosure of the storage system and the second disk enclosure of the storage system.

19. A computer program product that includes a computer readable medium having instructions stored thereon for graphically displaying electrical connections among a disk enclosures of a storage system, such that the instructions, when carried out by a controller, causes the controller to perform the steps of:

identifying each disk enclosure of the storage system;

detecting connection characteristics of electrical connections among the identified disk enclosures of the storage system, the connection characteristics indicating a relative order of the disk enclosures of the storage system; and outputting a graphical representation of (i) each identified disk enclosure of the storage system and (ii) the detected connection characteristics of the electrical connections among the identified disk enclosures.

20. A storage system, comprising:

disk enclosures; and a disk processor enclosure electrically coupled to the disk enclosures of the storage system, the disk processor enclosure configured to:

identify each disk enclosure of the storage system;

detect connection characteristics of electrical connections among the identified disk enclosures of the storage system, the connection characteristics indicating a relative order of the disk enclosures of the storage system; and output a graphical representation of (i) each identified disk enclosure of the storage system and (ii) the detected connection characteristics of the electrical connections among the identified disk enclosures.

* * * * *